(12) United States Patent
Sabia et al.

(10) Patent No.: US 6,616,274 B1
(45) Date of Patent: Sep. 9, 2003

(54) READY READER EYEGLASSES WITH MAGNETS RECESSED INTO FRONT OF FRAME, INCLUDING CARRYING CASE AND FERROMAGNETIC STRIP

(75) Inventors: Michael C. Sabia, Kings Park, NY (US); Denise M. Nathanson, San Leandro, CA (US)

(73) Assignee: California Optical, San Leandro, CA (US)

( * ) Notice: Subject to any disclaimer, the term of this patent is extended or adjusted under 35 U.S.C. 154(b) by 0 days.

(21) Appl. No.: 10/098,724

(22) Filed: Mar. 18, 2002

(51) Int. Cl.⁷ .................................................. G02C 1/00
(52) U.S. Cl. ........................ 351/158; 351/63; 351/155; 248/309.1; 24/3.8
(58) Field of Search ................................. 351/155, 158, 351/63; 248/309.1, 902; 24/3.1, 3.3, 3.8; 211/85.1

(56) References Cited

U.S. PATENT DOCUMENTS

| 5,278,591 | A |   | 1/1994  | Trotter |        |
|-----------|---|---|---------|---------|--------|
| 5,416,537 | A |   | 5/1995  | Sadler  |        |
| 5,448,317 | A | * | 9/1995  | Huang   | 351/63 |
| 5,568,207 | A |   | 10/1996 | Chao    |        |
| 5,642,177 | A |   | 6/1997  | Nishioka|        |
| 5,691,796 | A |   | 11/1997 | Negishi |        |
| 5,737,054 | A |   | 4/1998  | Chao    |        |
| 5,786,880 | A |   | 7/1998  | Chao    |        |
| 5,877,838 | A |   | 3/1999  | Chao    |        |
| 5,882,101 | A |   | 3/1999  | Chao    |        |
| 5,883,688 | A |   | 3/1999  | Chao    |        |
| 5,929,964 | A |   | 7/1999  | Chao    |        |
| 5,949,515 | A | * | 9/1999  | Hoshino | 351/41 |
| 5,988,811 | A |   | 11/1999 | Ku      |        |
| 6,168,273 | B1|   | 1/2001  | Dupraz et al. |  |
| 6,447,116 | B1| * | 9/2002  | Chao    | 351/63 |

FOREIGN PATENT DOCUMENTS

JP  7-244260  9/1995

* cited by examiner

*Primary Examiner*—Huy Mai
(74) *Attorney, Agent, or Firm*—Harris Zimmerman

(57) ABSTRACT

Frames for ready reader eyeglasses are provided which include a permanent magnet protruding forwardly from the front frames adjacent each lense making the eyeglasses removably attachable to any ferromagnetic surface for temporary storage. A ferromagnetic strip is adhesively affixable to non-ferromagnetic surfaces such as computer monitors to allow attachment of the eyeglasses. A rigid carrying case with pocket clip protects the eyeglasses from damage during periods of non-use.

14 Claims, 3 Drawing Sheets

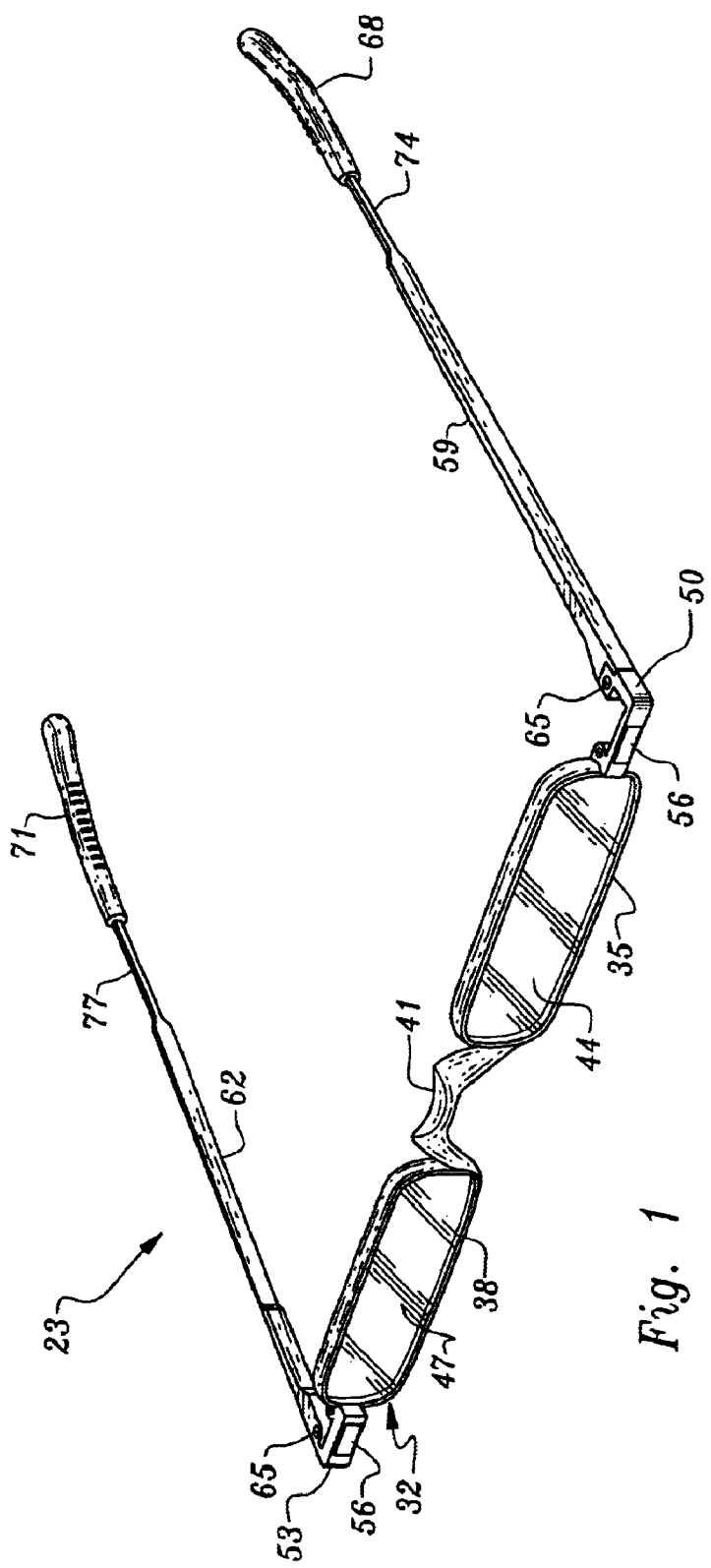
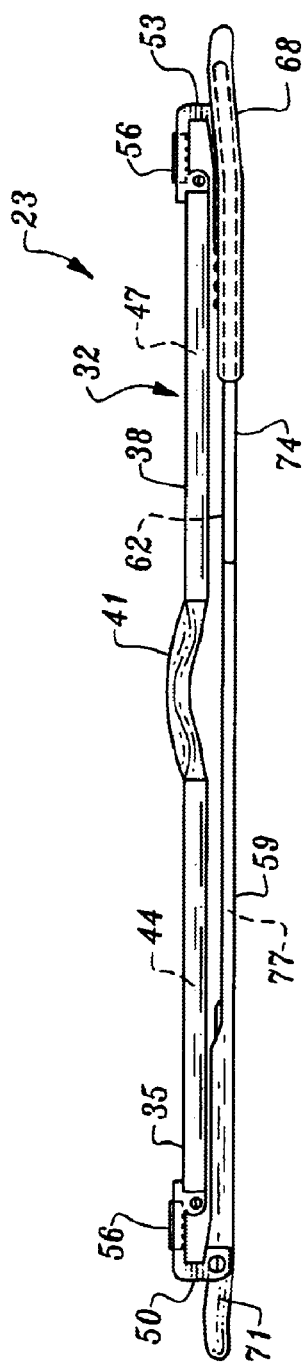

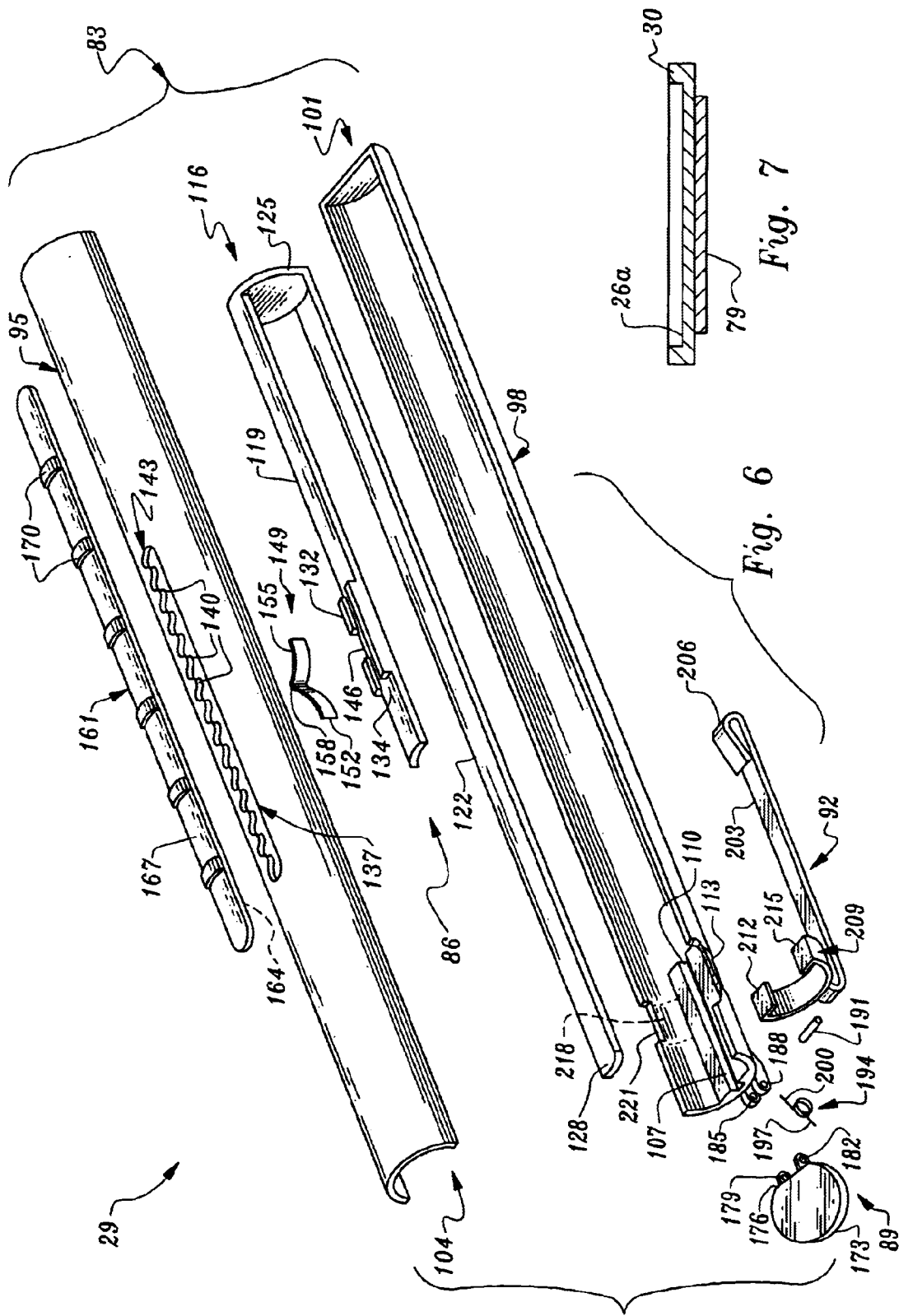

READY READER EYEGLASSES WITH MAGNETS RECESSED INTO FRONT OF FRAME, INCLUDING CARRYING CASE AND FERROMAGNETIC STRIP

BACKGROUND OF THE INVENTION

1. Field of Invention

The present invention relates to eyeglass frames and carrying cases for eyeglasses, and more specifically to eyeglasses which include magnets for attachment to ferromagnetic surfaces and substantially rigid carrying cases for eyeglasses.

2. Description of Related Art

Magnets Used In Eyeglasses

Magnets have been used in conjunction with eyeglasses in a variety of applications, including magnetic auxiliary eyeglass frames such as sunglasses which removably attach to magnetic primary eyeglass frames, magnetic eyeglass frames to retain eyeglasses to a receiving support such as a vehicle dashboard, and magnetic nose pieces.

Magnetic Eyeglass Frames to Retain Auxiliary Eyeglasses to Primary Eyeglasses: The use of permanent magnets and magnetized ferromagnetic magnets to removably retain auxiliary eyeglasses, such as sunglasses, to a primary eyeglasses is well known in the eyeglass art. The magnets are sometimes used in conjunction with other purely mechanical devices which supplement the proneness of magnets to slippage when used alone. Examples of both include the disclosures of U.S. Pat. No. 5,416,537 issued to Sadler; U.S. Pat. No. 5,642,177 issued to Nishioka; and U.S. Pat. Nos. 5,882,101; 5,883,688; 5,877,838; 5,786,880; 5,737,054; and 5,568,207 all issued to Chao.

Magnetic Eyeglass Frames to Retain Eyeglasses to a Receiving Support: In U.S. Pat. No. 6,168,273 issued to Dupraz et al. is disclosed eyeglasses to which is affixed to at least one of the side ear pieces a magnet which extends therethrough toward the outside of the side ear piece. A mating ferrous disk is affixed to a supporting article such as the dashboard of a vehicle, a bicycle, or a garment to temporarily secure the eyeglasses thereto.

In Japanese Patent No. JP-07 244260 is disclosed eyeglasses which can be magnetically attached to a metal support. The eyeglasses comprise a front frame which holds a pair of lenses, and a pair of side ear pieces hingedly connected thereto. The front frame includes a pair of permanent magnets laterally adjacent the lenses. The magnets are affixed to or integrally molded into the front frame to form respective forward protrusions. The protrusions extend forward in a plane at the front side of the remainder of the front frame and the curvature of the lenses to protect the front frame and lenses from damage when attached to a planar metallic surface. A problem with these eyeglasses is that they can only be attached to metallic surfaces and therefore can only be used to attach to devices having such metallic surfaces.

Magnetic Nose Pieces: In U.S. Pat. No. 5,988,811 issued to Ku is disclosed a nose pad for eyeglasses. A pair of the nose pads each containing a permanent magnet are pivotally mounted to the eyeglass wire eyeglass frame. The pair of permanent magnets attract one other to cause the nose pads to rest firmly on the nose of the user to prevent downward movement of the eyeglasses on the nose. Another example of magnets used in nose pieces is disclosed in U.S. Pat. No. 5,691,796 issued to Negishi.

Ready Readers

Ready readers are eyeglasses which include lenses of standard width, but of truncated height. The lenses typically provide magnification such as for assembling tiny component parts or for reading text, but can also be prescription lenses. One problem with such ready reader eyeglasses is that since they are used only during those portions of the day when assembly work or reading is done, they must be stored during periods of non-use. However, applicants are not aware of any carrying cases specifically designed for ready reader eyeglasses. Therefore, they are typically carried in a shirt pocket or purse where the lenses can be scratched and the metal frames bent.

There is a need for a device for storing the ready reader eyeglasses which protects them during periods of non-use.

SUMMARY OF INVENTION

1. Advantages of the Invention

One of the advantages of the present invention is that it provides ready reader eyeglasses which are magnetic for convenient and safe storage attached to any device made of ferromagnetic material rather than in a shirt pocket or purse.

A further advantage of the present invention is that it provides a ferromagnetic strip which adhesively attaches to devices which are not made of non-ferromagnetic material so that the ready reader eyeglasses can be attached such as to the plastic of computer monitors.

Another advantage of the present invention is it provides a carrying case which protects the frames of the ready reader eyeglasses from being bent and the lenses from being scratched.

Another advantage of the present invention is that it provides the eyeglasses, ferromagnetic strip with adhesive strip, and carrying case in convenient form of a kit.

These and other advantages of the present invention may be realized by reference to the remaining portions of the specification, claims, and abstract.

2. Brief Description of the Invention

The invention comprises a ready reader eyeglass frame which includes a ferromagnetic material meaning in this specification and claims permanent magnets, magnetized ferrous metals, and non-magnetized ferrous metals (hereinafter all referred to as ferromagnetic materials, members, strips, etc.); a ferromagnetic strip for affixing to a non-ferromagnetic surface to which the eyeglass frames can be attached for temporary storage; a carrying case for ready reader eyeglasses; and a ready reader eyeglass kit containing two or more of the aforementioned devices.

The ready reader eyeglass frame is for use with a pair of ready reader lenses, and is releasibly connectable to a substantially flat surface of a ferromagnetic material for temporary storage thereagainst. The eyeglass frame includes a front frame which includes respective left and right tense holding frames interconnected by a nose bridge. Each tense holding frame has a respective lateral projection which extends laterally outwardly therefrom opposite said nose bridge. An elongate side ear piece is hingedly connected to each respective side projection. At least one ferromagnetic member is affixed to each lateral projection. A frontmost surface of a pair of at least one of the projections and the magnets from each side of the front frame extend in a common plane forward of the front frame. The frontmost surfaces solely contact the flat surface of the ferromagnetic material during temporary storage thereagainst to protect the front frame and lenses from damage. The ferromagnetic members affixed to the lateral projections are preferably permanent magnets for attachment to the flat surface of a ferromagnetic material.

The ferromagnetic strip comprises a thin sheet of a ferromagnetic material. The strip is of such size as to accommodate the eyeglass frame, and is affixable such as to a non-ferromagnetic surface using an attachment device, preferably comprising double sided adhesive tape which includes a foam core. The strip is of such as size to simultaneously accommodate both permanent magnets of the eyeglass frame for temporary storage thereon.

The carrying case for the ready reader eyeglasses comprises an elongate, tubular housing which is closed on one end and open on an opposite end thereof. The housing is substantially rigid so as to resist deformation, defining an elongate inner chamber configured to completely contain the eyeglasses in a folded condition. A pocket clip is preferably connected to the housing adjacent the open end, being adapted to supporting the carrying case in an upright position with the open end facing upwardly within a shirt pocket. The carrying case includes a retaining device which is operatively connected to the housing for retaining the eyeglasses within the housing until desired to remove the eyeglasses therefrom by overcoming a retaining force keeping the eyeglasses therewithin. The retaining device preferably comprises a door which is hingedly connected to the housing adjacent the open end, and which is spring biased to a position covering the open end of the housing. The carrying case further includes an ejection device which is operatively connected to the housing for ejecting the eyeglasses from within the housing. The ejection device preferably comprises a slider which is longitudinally slidably disposed within the inner chamber. The slider includes an end wall which is disposable adjacent the closed end of the housing when the glasses are disposed within the housing. The slider can be moved longitudinally by hand manipulation external of the housing, such as by using a thumb slide, toward the open end such that the end wall bears against the eyeglasses to at least partially eject the eyeglasses from the housing. The slider is preferably operatively connected to and opens the door against the spring bias prior to the eyeglasses being partially ejected from the housing. The carrying case preferably includes a spring which is disposed between the thumb slide and the slider, which individually engages a plurality of linearly disposed detents of the housing so as to provide a plurality of stop positions for the slider.

The ready reader eyeglass kit comprises the ready reader eyeglass frame, the ferromagnetic strip, and the carrying case for ready reader eyeglasses, or some sub-combination thereof containing two of the devices.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein:

FIG. 1 is substantially a perspective view of the reading glasses of the present invention shown with the side ear pieces in an unfolded position;

FIG. 2 is substantially a top plan view of the reading glasses shown with the side ear pieces in a folded position for storage;

FIG. 6 is substantially an exploded view of the carrying case, with one half shell partially broken to show the inner slot and projections.

FIG. 7 is a cross-sectional view of a modified form of ferromagnetic strip.

DESCRIPTION OF THE PREFERRED EMBODIMENT

Figure 4:
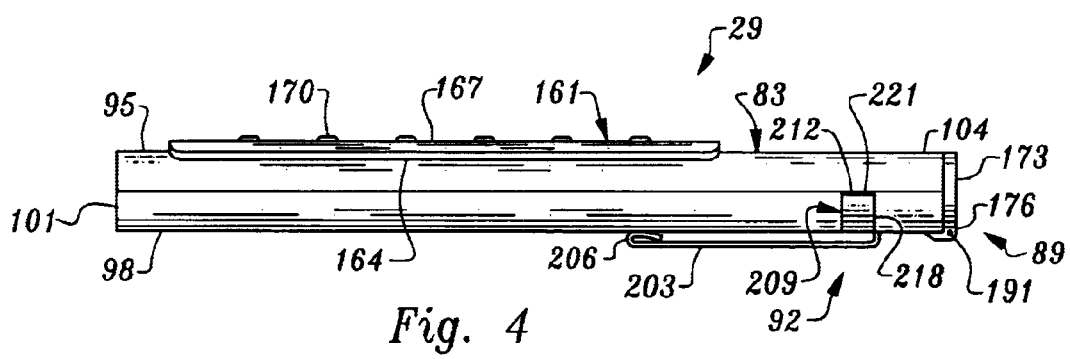
FIG. 4 is substantially a side elevational view of a carrying case of the present invention for the reading glasses which clips to a shirt pocket.

As seen in FIGS. 1 and 4, the present invention comprises a reading eyeglass and carrying case kit, generally indicated by reference number 20. Reading eyeglass and carrying case kit 20 includes a pair of ready reader eyeglasses 23, an eyeglass retaining strip 26, and an eyeglass carrying case 29.

Eyeglasses

Eyeglass Frame: As best shown in FIGS. 1 and 2, eyeglasses 23 include a eyeglass frame 32 having respective left and right eyeglass frames 35 and 38 which are interconnected by an integral nose piece 41. A pair of respective left and right reading lenses 44 and 47 snap-fit into the respective eyeglass frames 35 and 38. Each of eyeglass frames 35 and 38 include a respective stud 50 and 53 which extend laterally outwardly therefrom, studs 50 and 53 being generally L-shaped. An elongate bar magnet 56 is affixed to each of studs 50 and 53, magnets 56 extending forwardly of eyeglass frame 32, and lenses 44 and 47.

Side Ear Pieces and Cushions: With continuing reference to FIGS. 1 and 2, eyeglasses 23 include respective left and right side ear pieces 59 and 62 which are hingedly connected to the respective studs 50 and 53 using screws 65. Respective ear cushions 68 and 71 are affixed to thin end portions 74 and 77 of the respective side ear pieces 59 and 62 to provide cushioning for wearer comfort. Side ear pieces 59 and 62 fold against eyeglass frame 32, one over the other, for compact storage during periods of non-use.

Eyeglass Retaining Strip

Figure 3:
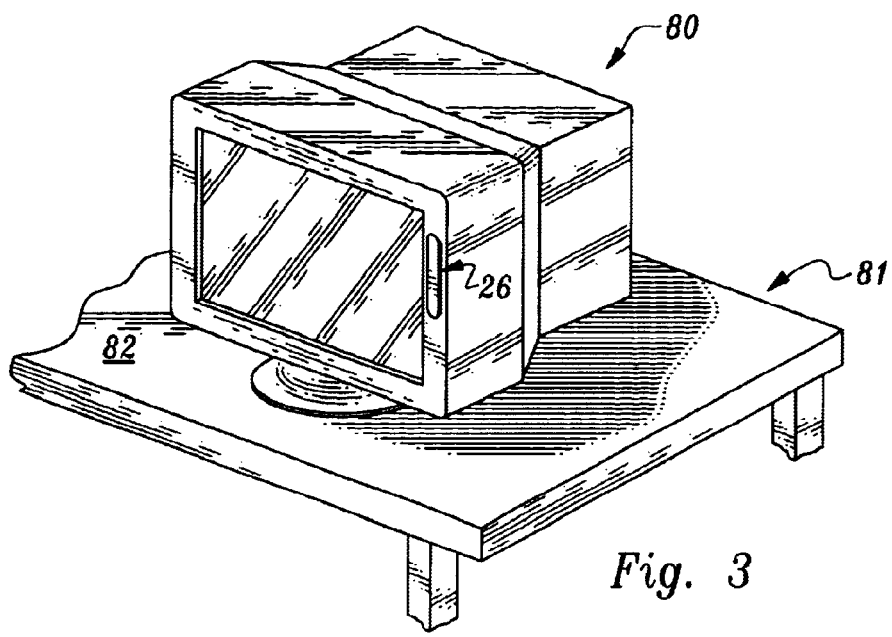
FIG. 3 is substantially a perspective view of a ferromagnetic strip adhesively attached to a computer screen with the reading glasses magnetically attached thereto.
Figure 5:
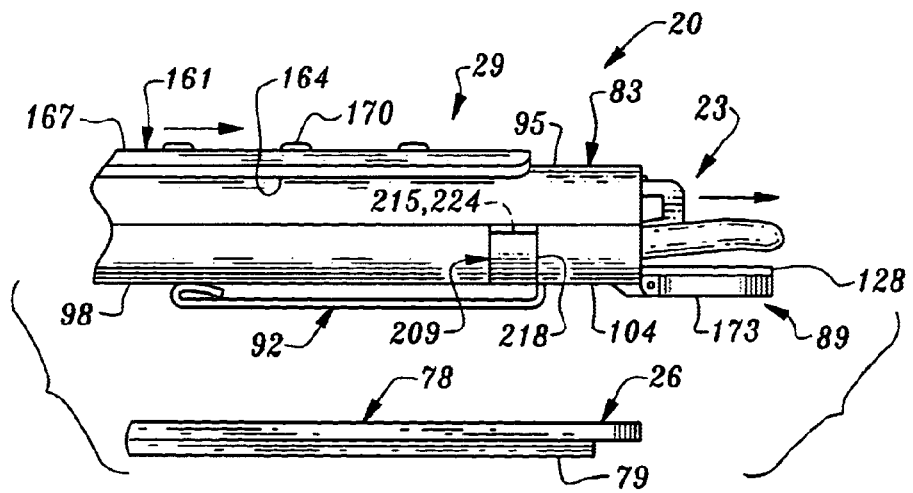
FIG. 5 is substantially a fragmentary side elevational view of the carrying case with the reading glasses being ejected therefrom.

Referring to FIGS. 3 and 5, eyeglass retaining strip 26 is made from thin sheet of ferromagnetic material 78 to which magnets 56 will releasibly affix, and of such length as to simultaneously engage both of magnets 56 when eyeglasses 23 are placed thereagainst. Double sided adhesive tape 79 is used to adhere retaining strip 26 to a desired object, such as a computer monitor 80 on a table 81 having a top 82, where eyeglasses 23 can be temporarily stored while not being used, yet within convenient reach when reading is required.

Eyeglass Carrying Case

Eyeglass carrying case 29 includes an elongate housing 83 of a generally oval outer cross-section, a slider assembly 86, a hinged door assembly 89, and a clip 92.

Housing: Housing 83 is comprised of a pair of half shells 95 and 98, each being of a generally half-oval outer cross-section, being affixed together such as by adhesives. Housing 83 includes a closed end 101 and an open end 104. Half shell 98 includes a longitudinally-extending inner slot 107 defined by a pair of projections 110 and 113.

Slider Assembly: Slider assembly 86 includes a U-shaped slider 116 which is disposed within housing 83, slider 116 having a short leg 119 and a long leg 122, both of mating cross-section with housing 83. Legs 119 and 122 are interconnected by a generally oval end wall 125. An end portion 128 of long leg 122 is slidably disposed within slot 107 of half shell 98. A pair of longitudinally-extending rails 131 and 134 extend radially outwardly from short leg 119, closely fitting within an elongate slider slot 137 through half shell 95. Slider slot 137 includes a plurality of detents 140 which extend along a locking side 143 thereof. Rail 131 is split in the middle so as to have an opening 146 which is disposed closely adjacent detents 140. A sheet metal spring 149 includes integral arcuate wings 152 and 155 which join at a pointed center portion 158. Spring 134 is of a width slightly less than the height of rails 119 and 122 so as to be disposed therebetween with pointed center 143 extending through opening 131, and with wings 137 and 140 bearing against rail 122 so as to bias pointed center 143 through opening 131 against detents 128. An elongate slider bar 161 includes a curved inner surface 164 which is affixed to rails 119 and 122 such as using adhesives to retain spring 134 against short leg 110, and to permit linearly moving of slider 107 inside housing 83 within the limits provided by rails 119 and 122 within slider slot 125. Slider bar 146 includes an outer surface 167 having a plurality of ribs 170 which facilitate sliding of slider bar 146 using a person's thumb.

Hinged Door Assembly: Hinged door assembly 89 includes a generally oval door 173 having a flat edge 176 from which a pair of ears 179 and 182 extend. A mating pair of ears 185 and 188 extend from halfshell 98 of housing 83. Door 173 is pivotally connected to half shell 98 using a pivot pin 191 which extends through the respective pairs of ears 179 and 182, and 185 and 188. Pivot pin 191 extends through a torsion spring 194 disposed between ears 185 and 188, torsion spring 194 having a pair of ends 197 and 200 which bear against door 173 and half shell 98 to bias door 173 toward a closed position covering open end 104 of housing 83.

Clip: Clip 92 is similar to that used on pens and other such devices which clip to the pocket of a shirt. Clip 92 includes an elongate arm 203 having a looped end 206, and a semi-circular portion 209 having a pair of inwardly directed end tabs 212 and 215. Semi-circular portion 209 snap-fits to half shell 98 within a semi-annular depression 218 which terminates at respective inwardly extending slots 221 and 224 adjoining half shell 95.

Operation of Eyeglass Carrying Case With Eyeglasses

Eyeglass carrying case 29 is used by pushing slider bar 161 towards open end 104 of housing 83, which causes end portion 128 of long leg 122 to engage and open door 173 against the bias of torsion spring 194. The ready reader eyeglasses 23 can then be inserted into housing 83 and slider bar 161 moved toward closed end 101 of housing 83. This causes end portion 128 of long leg 122 to disengage from door 173, which closes under the bias of torsion spring 194. The procedure is reversed to eject eyeglasses 23 from carrying case 29, with end wall 125 bearing against eyeglasses 23 to eject them from housing 83 after door 173 is opened.

Modified Eyeglass Retaining Strip

FIG. 7 discloses a modification of the strip 26. In the previously described version, the strip is formed from a thin flat sheet of ferromagnetic material. In this modification, the strip 26A is provided with an upstanding lip of flange 30 which prevents the removably attached eyeglasses from sliding or skidding of the plate when attached thereto. The lip also serves to further protect the eyeglass lenses when supported on the plate by providing a peripheral guard extending around the eyeglasses.

CONCLUSION

It can now be seen that the present invention solves many of the problems associated with the prior art. The present invention provides ready reader eyeglasses which are magnetic for convenient and safe storage attached to any device made of ferromagnetic material rather than in a shirt pocket or purse. The present invention provides a ferromagnetic strip which adhesively attaches to devices which are not made of non-ferromagnetic material so that the ready reader eyeglasses can be attached such as to the plastic of computer monitors. The present invention provides a carrying case which protects the frames of the ready reader eyeglasses from being bent and the lenses from being scratched. The present invention provides the eyeglasses, ferromagnetic strip with adhesive strip, and carrying case in convenient form of a kit.

Although the description above contains many specifications, these should not be construed as limiting the scope of the invention but as merely providing illustrations of some of presently preferred embodiments of this invention. The specification, for instance, makes reference to the magnets being part of the eyeglasses and the retaining strip being made of a ferromagnetic material. However, these could be reversed wherein respective ferromagnetic bars replace the magnets in the eyeglasses and the retaining strip includes one or more magnets configured to retain the eyeglasses in the same manner. Likewise, while the ferromagnetic strip is preferably attached using double sides adhesive tape for ease of application, the strip could be attached using a separate adhesive, or even built into the device such as screwed or riveted to a computer monitor screen. Also, while the carrying case is preferably substantially rigid, softer cases are contemplated could be made which might not utilize the ejection assembly and spring loaded door. Thus, the scope of the invention should be determined by the appended claims and their legal equivalents rather than by the examples given.

What is claimed is:

1. A ready reader eyeglass frame for use with a pair of ready reader lenses and a support for said eyeglass frame, the eyeglass frame being releasibly attachable to a substantially flat ferromagnetic surface of said support for temporary storage thereagainst, comprising:

a front frame which includes respective left and right lens holding frames interconnected by a nose bridge, each lens holding frame having a respective lateral projection which extends laterally outward therefrom opposite said nose bridge;

a pair of elongate side ear pieces, each of which is hingedly connected to a separate one of said lateral projections; and ferromagnetic material affixed to each lateral projection and having a frontmost surface situated forward of said front frame to contact the flat surface of the ferromagnetic surface of said support during temporary storage thereagainst, said support having a length sufficient to enable emplacement of said ferromagnetic material of each of said lateral projections against said ferromagnetic surface of the support, an attachment device for securing said support to a non-ferromagnetic surface, at least one of said ferromagnetic surface and said ferromagnetic material being permanently magnetized.

2. The eyeglass frame and support of claim 1, wherein the attachment device comprises double sided adhesive tape.

3. The eyeglass frame and support of claim 2, wherein the double sided adhesive tape includes a foam core.

4. A carrying case for ready reader eyeglasses, comprising an elongate, tubular housing which is closed on one end and open on an opposite end thereof, said housing being substantially rigid so as to resist deformation and defining an elongate inner chamber configured to completely contain the eyeglasses in a folded condition, further comprising a retaining device which is operatively connected to the housing for retaining the eyeglasses within the housing until desired to remove the eyeglasses therefrom by overcoming a retaining force keeping the eyeglasses therewithin, wherein the retaining device comprises a door which is hingedly connected to the housing adjacent the open end, and which door is spring biased by the retaining force to a position covering said open end of said housing, wherein at least a portion of the housing is translucent to allow viewing of whether the eyeglasses are disposed within the housing without requiring opening of the door.

5. A carrying case for ready reader eyeglasses, comprising an elongate, tubular housing which is closed on one end and open on an opposite end thereof, said housing being substantially rigid so as to resist deformation and defining an elongate inner chamber configured to completely contain the eyeglasses in a folded condition, further comprising a retaining device which is operatively connected to the housing for retaining the eyeglasses within the housing until desired to remove the eyeglasses therefrom by overcoming a retaining force keeping the eyeglasses therewithin, further comprising an ejection device which is operatively connected to the housing for ejecting the eyeglasses within the housing against the retaining force of the retaining device when desired to remove the eyeglasses therefrom.

6. The carrying case of claim 5, wherein the ejection device comprises a slider which is longitudinally slidably disposed within the inner chamber, said slider having an end wall which is disposable adjacent the closed end of the housing when the eyeglasses are disposed within said housing, and which slider can be moved longitudinally by hand manipulation external of said housing toward the open end such that said end wall bears against the eyeglasses to at least partially eject the eyeglasses from said open end of said housing against the retaining force of the retaining device.

7. The carrying case of claim 6, wherein the retaining device comprises a door which is hingedly connected to the housing adjacent the open end, the retaining force comprising said door being spring biased to a position covering said open end of said housing, and wherein the ejection device is operatively connected to and opens said door prior to the eyeglasses being partially ejected from said open end of said housing against the spring bias of said door.

8. The carrying case of claim 6, further comprising a thumb slide which is disposed external of the housing, said thumb slide which is operatively connected to move the slider longitudinally within said housing by hand manipulation of said thumb slide.

9. The carrying case of claim 8, wherein a spring is disposed between the thumb slide and the slider, said spring which individually engages a plurality of linearly disposed detents of the housing to provide a plurality of stop positions for said slider when ejecting the eyeglasses.

10. A ready reader eyeglass kit, comprising:

a ready reader eyeglass frame for use with a pair of ready reader lenses, the eyeglass frame being releasibly connectable to a substantially flat surface of a ferromagnetic material for temporary storage thereagainst, said eyeglass frame having a front frame which includes respective left and right lens holding frames interconnected by a nose bridge, each lens holding frame having a respective lateral projection which extends laterally outward therefrom opposite said nose bridge, a pair of elongate side ear pieces, each of which is hingedly connected to a respective lateral projection, and a pair of permanent magnets each magnet being affixed to a separate one of said lateral projections such that frontmost of each magnet extends in a common plane forward of said front frame to solely contact the flat surface of the ferromagnetic material during temporary storage thereagainst;

further including a linear strip of said ferromagnetic material having a length sufficient to enable emplacement of both of said magnets thereagainst and means for adhering said strip of ferromagnetic material to a surface of non-ferromagnetic material for temporary storage of the eyeglasses thereagainst; and a carrying case for said eyeglasses, having an elongate, tubular housing which is closed on one end and open on an opposite end thereof, said housing being substantially rigid so as to resist deformation and defining an elongate inner chamber configured to completely contain the eyeglasses in a folded condition.

11. The eyeglass kit of claim 10, wherein the carrying case includes a retaining device which is operatively connected to the housing for retaining the eyeglasses within the housing until desired to remove the eyeglasses therefrom by overcoming a retaining force keeping the eyeglasses therewithin, said retaining device comprising a door which is hingedly connected to the housing adjacent the open end, and which door is spring biased by the retaining force to a position covering said open end of said housing.

12. The eyeglass frame of claim 10 in which said ferromagnetic strip is provided with a linear peripheral flange extending along an edge thereof.

13. The eyeglass frame of claim 12 in which said flange is continuous along substantially the entire edge of the strip.

14. A ready reader eyeglass kit, comprising:

a ready reader eyeglass frame for use with a pair of ready reader lenses, the eyeglass frame being releasibly connectable to a substantially flat surface of a ferromagnetic material for temporary storage thereagainst, said eyeglass frame having a front frame which includes respective left and right lens holding frames interconnected by a nose bridge, each lens holding frame having a respective lateral projection which extends laterally outward therefrom opposite said nose bridge, a pair of elongate side ear pieces, each of which is hingedly connected to a respective lateral projection, and at least one permanent magnet affixed to each lateral projection such that a frontmost surface of a pair of at least one of said lateral projections and said magnets from each side of said front frame extend in a common plane forward of said front frame to solely contact the flat surface of the ferromagnetic material during temporary storage thereagainst, and a carrying case for said eyeglasses, having an elongate, tubular housing which is closed on one end and open on an opposite end thereof, said housing being substantially rigid so as to resist deformation and defining an elongate inner chamber configured to completely contain the eyeglasses in a folded condition, wherein the carrying case includes an ejection device which is operatively connected to the housing for ejecting the eyeglasses within said housing against the retaining force of the retaining device when desired to remove the eyeglasses therefrom, said ejection device comprising a slider which is longitudinally slidably disposed within the inner chamber, said slider having an end wall which is disposable adjacent the closed end of the housing when the glasses are disposed within said housing, and which slider can be moved longitudinally by hand manipulation external of said housing towards the open end such that said end wall bears against the eyeglasses to at least partially eject the eyeglasses from said open end of said housing against the retaining force of the retaining device, and wherein said retaining device comprising a door which is hingedly connected to said housing adjacent the open end, the retaining force comprising said door being spring biased to a position covering said open end of said housing, and wherein the ejection device is operatively connected to opens said door prior to the eyeglasses being partially ejected from said open end of said housing against the spring bias of said door.

* * * * *